Aug. 19, 1958     T. J. BUTLER     2,847,735
APPARATUS AND METHOD FOR PRESSURE MOLDING FOUNDRY SAND
Filed Feb. 25, 1955     2 Sheets-Sheet 1
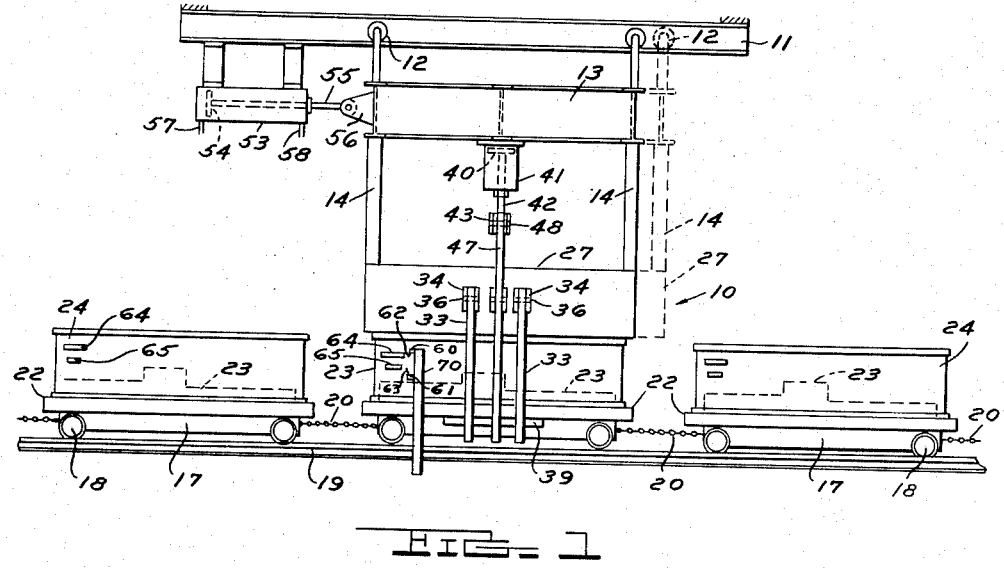
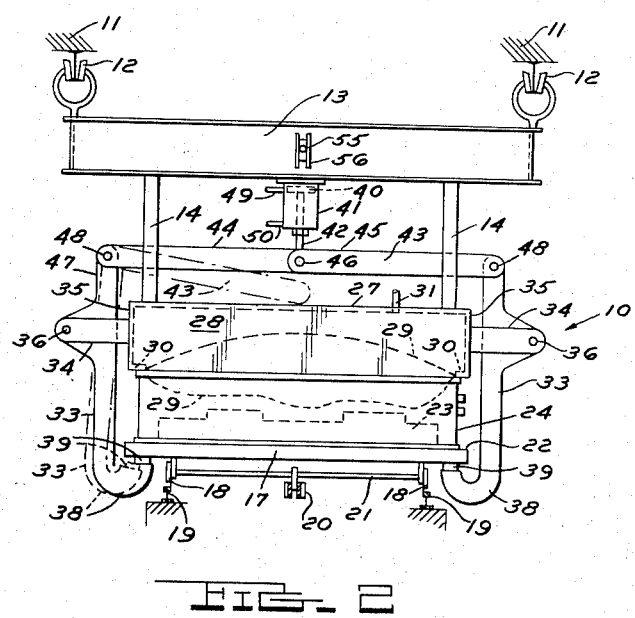
INVENTOR.
THOMAS J. BUTLER
BY
*Barnes, Kisselle, Laughlin & Raisch*
ATTORNEYS

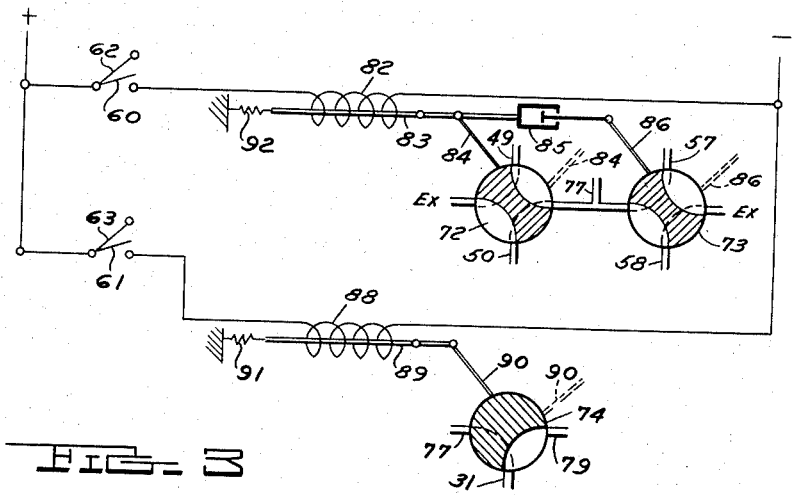
Fig. 3
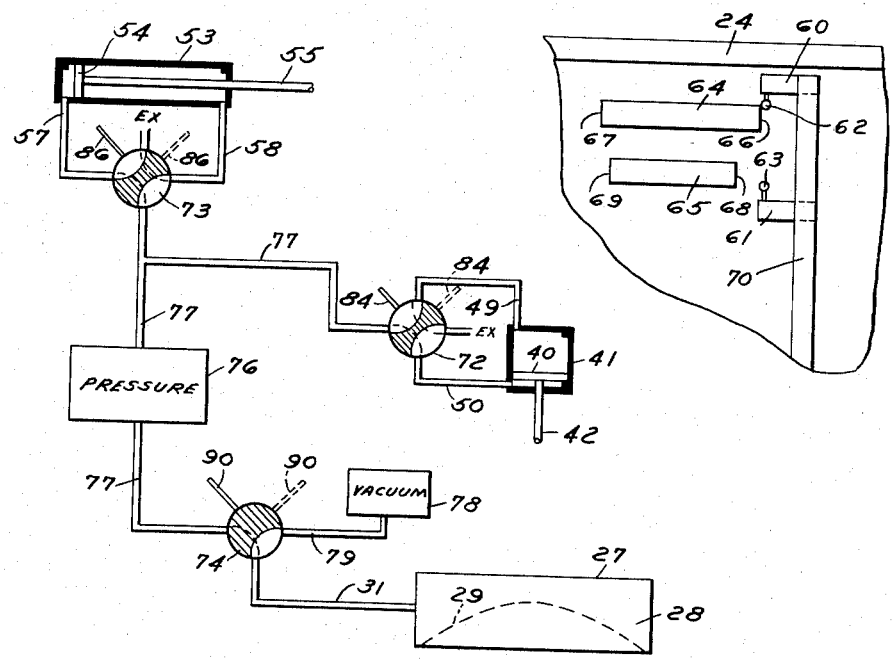
Fig. 5
Fig. 4
INVENTOR.
THOMAS J. BUTLER
BY
Barnes, Kisselle, Laughlin & Raisch
ATTORNEYS

United States Patent Office 2,847,735
Patented Aug. 19, 1958

2,847,735

APPARATUS AND METHOD FOR PRESSURE MOLDING FOUNDRY SAND

Thomas J. Butler, Dearborn, Mich.

Application February 25, 1955, Serial No. 490,486

19 Claims. (Cl. 22—20)

This invention relates to an apparatus and method of pressure molding fluent materials such as foundry sand.

This invention is especially adapted for large quantity industrial molding operations where rapidity is an important factor. Heretofore quantity molding of foundry sand has been performed on stationary machines having a molding head which is applied successively to a number of fixed flasks or pattern boxes. The pattern boxes remain stationary while the machine is being loaded and unloaded and while the molding head is in operation with a consequent loss of time.

An object of this invention is to provide a simple, inexpensive method and apparatus for rapidly molding foundry sand and the like in a continually moving succession of pattern boxes or flasks. The invention generally contemplates mounting a molding head adjacent a continually moving conveyor carrying a succession of flasks, moving the head with the carrier as it is applied to each flask and retracting the head for application to a subsequent flask when the molding is completed. One form of the invention is shown in the accompanying drawings:

Fig. 1 is a generally diagrammatic elevational view of molding apparatus according to this invention.

Fig. 2 is an enlarged generally diagrammatic end view illustrating the molding head applied to a pattern box.

Fig. 3 is a schematic representation of an electrical circuit for actuating control valves in the apparatus.

Fig. 4 is a schematic representation of a pneumatic circuit for operating the apparatus.

Fig. 5 is an enlarged fragmentary diagrammatic view illustrating means for operating control switches for the apparatus.

Shown in Fig. 1 is molding apparatus according to this invention and including a pressure molding head 10 supported by rails 11 through rollers 12, a frame 13 and support elements 14 depending therefrom. A conveyor movable beneath the molding head preferably comprises a number of trucks or carts 17 having wheels 18 carried by rails 19 extending generally parallel to rails 11. The trucks are interconnected by flexible means such as chains 20 connected to the axles 21 of the carts as shown and the beds 22 of the trucks are arranged to carry patterns 23 and flasks or pattern boxes 24.

Pressure head 10 includes a hollow box 27 supported by frame elements 14 and forming a pressure chamber 28 having a flexible element or diaphragm 29 forming its bottom wall. Diaphragm 29 may be made of a suitable flexible material such as a natural or synthetic rubber or an elastomeric material and its edges are preferably secured to inwardly extending flanges 30 at the bottom of the pressure box. A conduit 31 connects into pressure chamber 28.

A number of tong members 33 are rotatably mounted on brackets 34 on opposite sides 35 of pressure box 27 by pivots 36. Tong members 33 are positioned so that when open trucks 17 carrying flasks 24 may pass freely therebetween. The lower end portions 38 of the tong members extend below beds 22 of trucks 17 and are return formed and preferably interconnected by bars 39. Pivots 36 are disposed in an outward position so that bars 39 engage the undersides of beds 22 in an upward direction when the tong members are closed.

The apparatus is illustrated as having three tong members 33 at each side of pressure box 27. The tong members are operably connected to a piston 40 in a pneumatic cylinder 41 on frame 13 through a piston rod 42 connected to a closing bar 43 having two sections 44 and 45 pivotally joined as at 46 and connected to upwardly projecting end portions 47 of the central tong members through pivots 48. Pneumatic conduits 49 and 50 connect into cylinder 41.

A pneumatic tracking cylinder 53 is mounted in a stationary position between rails 11 (Fig. 1) and has a piston 54 with a piston rod 55 extending generally parallel to rails 11 and connected to a suitable bracket 56 on frame 13. Pneumatic conduits 57 and 58 connect into cylinder 53.

Switches 60 and 61 (Fig. 3) for actuating the pressure head have operating elements 62 and 63, respectively, mounted in a stationary position for engagement by lugs 64 and 65 on flasks 24 as they move by on trucks 17. The operating elements may conveniently be mounted on a stationary post 70 adjacent rails 19. Each lug 64 is longer than lug 65 with its leading and trailing edges 66 and 67 extending forwardly and rearwardly of the leading and trailing edges 68 and 69 of lug 65 (Fig. 5).

In use, it may be assumed that flasks 24 with patterns 23 therein have been loaded on trucks 17 together with the sand to be molded around the patterns. The train of trucks is moved by suitable means (not shown) toward the right as Fig. 1 is viewed so that the trucks pass successively under pressure head 10. Piston 54 in tracking cylinder 53 and pressure head 10 are in the retracted position shown in solid lines in Fig. 1 and tongs 33 and closing bar 43 are in open position as illustrated in dotted lines in Fig. 2 with piston 40 in cylinder 41 in the downward position of Fig. 4. Diaphragm 29 is retracted into pressure chamber 28 (Figs. 2 and 4).

When a truck 17 reaches a position beneath molding head 10 generally as shown in Fig. 1, lug 64 engages operating element 62 to close switch 60 to energize an electrical circuit for retracting piston 40 to the upward position shown in Figs. 1 and 2. Piston rod 42 elevates closing bar sections 44 and 45 to straightened relation, forcing the upper end portions 47 of the central tong members 33 outwardly and forcing the interconnected lower end portions 38 of the tong members inwardly. Since pivots 36 lie in an outward position, the closing motion of the lower ends of the tong members is in a generally upward direction as illustrated so that bars 39 engage upwardly against bottom portions of truck bed 22.

The closing action of the tongs lifts the entire truck 17 slightly upwardly so that the top of flask 24 is clamped against inward flanges 30 on the pressure box. The parts are now in the position shown generally in solid lines in Fig. 2 with diaphragm 29 still in its retracted or upward position. Wheels 18 may be elevated slightly off of rails 19 with the wheel flanges preferably still engaged against the rails as illustrated in Fig. 2.

After tongs 33 have closed a valve is actuated to move piston 54 in tracking cylinder 53 to the right as Fig. 1 is viewed, thereby advancing frame 13 and pressure head 10 along with truck 17. The rate at which fluid is introduced into cylinder 53 is regulated so that piston 54 advances frame 13 at the same speed as trucks 17 so that little or no additional tractive force need be applied to the train of trucks to move the pressure head and its supporting frame. The flanges on wheels 18 stabilize the structure laterally by continued engagement with rails 19.

When tongs 33 have clamped pattern box 24 against pressure box 27, lug 65 engages operating element 63 and closes switch 61 to energize a circuit for introducing pressure into pressure chamber 28. Diaphragm 29 is forced downwardly into flask 24 to generally the lower position shown in Fig. 2. The diaphragm forces the sand in the pattern box or flask around pattern 23 to accomplish the molding. The entire pressure head 10 and its supporting frame are moving continuously to the right with trucks 17 during the molding as described.

Lug 65 has a length sufficient so that it remains engaged with operating element 63 until the molding is complete. After the molding has been accomplished, lug 65 passes and disengages operating element 63 to open switch 61 for exhausting pressure chamber 28 and introducing vacuum thereto. Diaphragm 29 is quickly retracted from the pattern box into pressure chamber 28. The pressure head and its supporting frame are now in the position indicated generally in dotted lines in Fig. 1. Lug 64 now disengages operating element 62 to open switch 60 for advancing piston 40 downwardly to open tongs 33 and lower truck 17 onto rails 19 so that the pattern box disengages flanges 30, freeing the truck for resumed independent movement toward the right.

A valve is now actuated for retracting piston 54 in tracking cylinder 53 to return frame 13 and pressure head 10 to its initial position shown in solid lines in Fig. 1 preparatory to application to a subsequent truck and pattern box. The cycle is repeated when another truck with pattern box thereon moves under pressure head 10 and lug 64 on the pattern box engages operating element 62. A truck having no flask thereon will pass under the pressure head without actuating it.

Chains 20 provide a flexable connection between the trucks, facilitating elevation of the trucks into molding engagement with pressure box 27. The molding forces are supported by the pressure head itself through tongs 33 rather than by the undercarriage of trucks 17 so that the trucks may have a relatively simple, inexpensive construction as shown without special spring suspension for absorbing the molding forces. The juncture between flanges 30 and a flask 24 is arranged to pass air relatively freely to facilitate movement of diaphragm 29. The joint may be vented if desired, but the normal irregularities in the parts incident to their manufacture may provide sufficient venting.

Electrical and pneumatic circuits for operating the apparatus are represented in Figs. 3 and 4. Control valves 72 and 73, operable respectively for advancing and retracting pistons 40 and 54 in cylinders 41 and 53, are actuated by switch 60; and valve 74 which controls molding diaphragm 29 is actuated by switch 61. The positions of control valves 72, 73 and 74 before switches 60 and 61 are closed are shown in solid lines. Conduits 49 and 58 on cylinders 41 and 53 are connected to a source of pressure 76 through a conduit 77 and conduit 31 on pressure box 27 is connected to a vacuum source 78 through a conduit 79.

The closing of switch 60 by engagement of a lug 64 with operating member 62 energizes a solenoid 82 which shifts an armature rod 83 and a connected operating lever 84 on valve 72 to its dotted line position to connect conduit 50 with pressure conduit 77 for moving piston 40 upwardly and closing tongs 33. Rod 83 has a lost motion joint 85 so that upon continued movement it shifts an operating lever 86 on valve 73 to its dotted line position to connect conduit 57 on tracking cylinder 53 to pressure conduit 77 for advancing frame 13 and the pressure head with the truck. Valves 72 and 73 remain in their dotted line positions for so long as lug 64 remains engaged with the operating element 62.

The closing of switch 61 by engagement of lug 65 with operating element 63 energizes a solenoid 88 whose armature rod 89 shifts the operating lever 90 of control valve 74 to its dotted line position for connecting conduit 31 with pressure conduit 77 to the introduced pressure into the chamber 28 and force diaphragm 29 downwardly to perform the molding.

The opening of switch 61 by disengagement of lug 65 and element 63 de-energizes solenoid 88 so that valve 74 is returned to its solid line position by a spring 91 connected to armature rod 89. Conduit 31 is thereby reconnected with vacuum conduit 79 to retract diaphragm 29 into pressure chamber 28. The subsequent opening of switch 60 upon disengagement of lug 64 and element 62 de-energizes solenoid 82 so that valve 72 is returned to its solid line position by a spring 92 on armature rod 83 to reconnect conduit 49 on cylinder 41 to pressure conduit 77, thereby releasing tongs 33.

Upon continued return movement of rod 83, lost motion joint 85 engages to shift operating lever 86 and valve 73 to their solid line positions, reconnecting conduit 58 on cylinder 53 with pressure conduit 77 to retract the pressure head to its initial position. The cycle is repeated when lugs 64 and 65 on a subsequent pattern box engage and disengage operating elements 62 and 63.

I claim:

1. Apparatus for molding fluent materials such as foundry sand and the like comprising, a molding head, tong means pivotally mounted on said molding head for swinging in a generally vertical direction, said tong means projecting downwardly of said molding head and having lower end portions, conveyor means, means operable to move said conveyor means between said tong means, means forming a plurality of pattern holders on said conveyor means, said pattern holders being adapted to carry patterns and a fluent material to be molded, said lower end portions of said tong means being disposed for generally upward engagement with portions of said conveyor means in one position of said tong means and for disengagement from said conveyor means in another position, whereby to releasably elevate said pattern holders into clamped engagement against said molding head to facilitate molding, said molding head being mounted for movement with said conveyor when said tong means is engaged with a pattern holder, and means operable to return said molding head for application to another pattern holder when said tong means is released.

2. Apparatus for molding fluent materials such as foundry sand and the like comprising, a molding head, conveyor means, means operable to move said conveyor means in a path adjacent said molding head, means forming a plurality of pattern holders on said conveyor means, said pattern holders being adapted to carry patterns and a fluent material to be molded, first powered means operable to releasably engage an adjacent pattern holder against said molding head to facilitate molding, said molding head being movable generally parallel to the direction of movement of said conveyor means, second powered means operable to advance said molding head with said conveyor means when said molding head is engaged with a pattern holder, said second powered means being operable to retract said molding head for application to another pattern holder when said head is released from a pattern holder.

3. Apparatus for molding fluent materials such as foundry sand and the like comprising, a molding head, conveyor means, means operable to move said conveyor means in a path adjacent said molding head, means forming a plurality of pattern holders on said conveyor means, said pattern holders being adapted to carry patterns and a fluent material to be molded, powered clamp means mounted on said molding head, said clamp means being operable to releasably clamp an adjacent pattern holder on said molding head to facilitate molding, said molding head being movable generally parallel to the direction of movement of said conveyor means, first powered means operable to advance said molding head with said conveyor means when said clamp means is engaged with a pattern holder, said first powered means being operable to retract said molding head for application to another pattern holder when said clamp means is released, second powered means operable to actuate said molding head for molding a material in a pattern holder clamped thereto, and means coordinating said clamp means and said first and second powered means for operation in a predetermined cycle.

4. Apparatus for molding fluent material such as foundry sand and the like comprising, a molding head which includes molding pressure applying means, a plurality of pattern holders adapted to carry patterns and a fluent material to be molded, means operative to move said pattern holders adjacent said molding head in a continuous movement, means in addition to said pressure applying means operable by said movement to bring said pattern holders and molding head into molding engagement while said pattern holders are moving, and mechanism operable to disengage said pattern holders and molding head after completion of the molding.

5. Apparatus for molding fluent material such as foundry sand and the like comprising, a molding head which includes molding pressure applying means, a plurality of pattern holders adapted to carry patterns and a fluent material to be molded, means operative to move said pattern holders beneath said molding head in a continuous movement, means in addition to said pressure applying means operable by said movement to elevate said pattern holders into molding engagement with said head while said pattern holders are moving, and mechanism operable to lower said pattern holders out of engagement with said head after completion of the molding.

6. Apparatus for molding fluent material such as foundry sand and the like comprising, a molding head, a plurality of pattern holders adapted to carry patterns and a fluent material to be molded, means operative to move said pattern holders subjacent said molding head in a continuous movement, first means operable by said movement to elevate said pattern holders into molding engagement with said molding head, second means operable by said movement to advance said molding head in a movement generally parallel to the movement of said pattern holders during the molding, said first means being operable by said movement of the pattern holders to lower said pattern holders out of engagement with said molding head after completion of the molding, said second operable means being operable by said movement of the pattern holders to retract said molding head after said pattern holders have been released therefrom.

7. Apparatus for molding fluent material such as foundry sand and the like comprising, a molding head, means forming a series of flexibly interconnected pattern holders adapted to carry patterns and a fluent material to be molded, means for moving said pattern holders serially adjacent said molding head in a continuous movement, said head being mounted for movement in a direction generally parallel to the movement of said pattern holders, means forming two cams on each of said pattern holders, means forming two stationary switches, each being positioned for engagement by one of said cams, first means operable by engagement of one of said cams with one of said switches for bringing said head and a pattern holder into molding engagement, second means operable by operation of said first means for advancing said head with a pattern holder thereon during the molding, and other means operable by engagement of said other cam with said other switch for effecting the molding, said other means being operable by disengagement of said other cam and said other switch to terminate the molding, said first means being operable by disengagement of said one cam and said one switch to disengage said pattern holder and molding head after completion of molding, said second means being operable by operation of said first means to retract said molding head for application to a subsequent pattern holder.

8. Apparatus for molding fluent materials such as foundry sand and the like comprising, a molding head, a series of carriers interconnected by flexible means, track means extending adjacent said head, means operable to continuously move said carriers on said track means, said carriers carrying pattern holders, said molding head being mounted for movement generally parallel to movement of said carriers, operable means operable to move said molding head and a pattern holder on a carrier adjacent to said molding head toward each other into molding interengagement, said molding head being movable with a pattern holder with which it is engaged during the molding, said operable means being operable to move said molding head and a pattern holder away from each other after the molding is completed, and means operable to return said molding head after disengagement from a pattern holder for application to a subsequent pattern holder.

9. The combination defined in claim 8 wherein said molding head is mounted on a track above and generally parallel to said track means.

10. Apparatus for molding fluent materials such as foundry sand and the like comprising, a molding head, a plurality of pattern holders adapted to carry patterns and a fluent material to be molded, means operative to move said pattern holders adjacent said molding head in a continuous movement, first means operable by said movement to move said pattern holders into molding engagement with said molding head, second means operable to advance said molding head in a movement generally parallel to the movement of said pattern holders during molding, said first means being operable upon completion of the molding to move said pattern holders out of engagement with said molding head, said second operable means being operable to retract said molding head after said pattern holders have been released therefrom.

11. Apparatus for molding fluent materials such as foundry sand and the like comprising, a molding head, a series of carriers interconnected by flexible means, means operable to continuously move said carriers adjacent said molding head, said carriers carrying pattern holders, said molding head being mounted for movement generally parallel to movement of said carriers, operable means operable to move said molding head and a pattern holder on a carrier adjacent said molding head toward each other into molding engagement, said molding head being movable with a pattern holder with which it is engaged during the molding, said operable means being operable to move said molding head and a pattern holder away from each other after the molding is completed, and means operable to return said molding after disengagement from a pattern holder for application to a subsequent pattern holder.

12. A method of molding fluent materials such as foundry sand which comprises, moving a pattern holder containing a pattern and a material to be molded thereon adjacent a molding head, moving said pattern holder and molding head toward each other so that they engage in molding relation while said pattern holder is moving, moving said molding head with said pattern holder and while so moving the same, applying molding pressure by means separate from the means by which said molding head and pattern holder were moved toward each other as described, moving said pattern holder and molding head away from each other to disengage the same after the molding, and returning said molding head for application to another pattern holder.

13. The method defined in claim 12 wherein said pattern holder is elevated into molding relation with said molding head and is lowered relatively to said molding head after the molding is completed.

14. A method of molding fluent material such as foundry sand which comprises, providing a pattern holder with a pattern thereon and material to be molded, providing a molding head which includes a chamber, moving said pattern holder in a path adjacent said molding head, moving said pattern holder and said molding head toward each other and securing them into molding engagement with said chamber over the pattern and material to be molded while continuing to move said pattern holder in said path, moving said molding head with said pattern holder and while so moving the same, introducing fluid medium under pressure into said chamber to effect the molding, moving said pattern holder and said molding head away from each other after the molding is completed, and returning said molding head for application to another pattern holder.

15. Apparatus for molding fluent material such as foundry sand and the like comprising, a molding head which includes molding pressure applying means, conveyor means, means operable to move said conveyor means in a path adjacent said molding head, means forming a plurality of pattern holders on said conveyor means, said pattern holders being adapted to carry patterns and a fluent material to be molded, movable clamping means operable to releasably exert supporting force on said pattern holders in a direction generally opposite to the direction of the molding force applied by said pressure applying means for releasably interengaging said pattern holders and molding head in molding relation, said supporting force being at least as great as said molding force whereby to support said pattern holders in molding engagement with said molding head against said molding force during molding, said molding head and clamping means being mounted for movement with said conveyor when said clamping means is engaged with a pattern holder for molding, and means operable to return said molding head for application to another pattern holder when said clamping means is released.

16. Apparatus for molding fluent material such as foundry sand and the like comprising, a molding head which includes molding pressure applying means operably to apply molding pressure in a generally downward direction, conveyor means, means operable to move said conveyor means beneath said molding head, means forming a plurality of pattern holders on said conveyor means, said pattern holders being adapted to carry patterns and a fluent material to be molded, movable clamping means operable to releasably exert supporting force on said pattern holders in a generally upward direction for releasably elevating said pattern holders into molding interengagement with said molding head, said supporting force being at least as great as said molding force whereby to support said pattern holders in molding engagement with said molding head against said molding force during molding, said molding head being mounted for movement with said conveyor when a pattern holder is engaged therewith for molding, and means operable to return said molding head for application to another pattern holder when said clamping means is released.

17. Apparatus for molding fluent material such as foundry sand and the like comprising, a molding head, a pattern holder for retaining a pattern and a fluent material to be molded about the pattern, means for moving the pattern holder along a path adjacent the molding head so that the pattern holder can be moved into juxtaposition with the molding head, said molding head and pattern holder having face portions which, when the head and pattern holder are juxtaposed, are disposed in spaced juxtaposed relation, releasable clamping means for relatively moving said head and pattern holder toward each other when juxtaposed to bring said face portions into contacting relation, said head including means for applying molding pressure to the fluent material retained by the pattern holder while said face portions are clamped in said contacting relation by said clamping means, said molding head being mounted for movement with said pattern holder to which it is clamped by said clamping means during the molding, and means operable to return said molding head for application to another pattern holder when said clamping means is released.

18. The apparatus defined in claim 17 wherein the molding force applied by said pressure applying means is directed against the fluent material in a direction generally normal to the general direction of extent of said face portions.

19. A method of molding fluent materials such as foundry sand which comprises, moving a pattern holder having face portions and containing a pattern and a material to be molded thereon adjacent a molding head having face portions cooperable with those of the pattern holder, securing the molding head and pattern holder into molding relation with said cooperable face portions contacting while said pattern holder is moving and, by means separate from the means by which said molding head and pattern holder are secured together, applying molding pressure to the material to be molded while continuing to move said pattern holder and molding head, releasing said cooperable faces from contact after the molding and returning said molding head for application to another pattern holder.

References Cited in the file of this patent

UNITED STATES PATENTS

| | | |
|---|---|---|
| 1,079,482 | Field | Nov. 25, 1913 |
| 1,108,694 | Burkhardt | Aug. 25, 1914 |
| 1,803,117 | Lesser et al. | Apr. 28, 1931 |
| 2,012,478 | Oyster et al. | Aug. 27, 1935 |
| 2,257,681 | Haux | Sept. 30, 1941 |
| 2,466,339 | Turner | Apr. 5, 1949 |
| 2,695,431 | Davis | Nov. 30, 1954 |
| 2,698,976 | Taccone | Jan. 11, 1955 |